Jan. 28, 1941.  H. KREIDEL  2,230,116
PIPE COUPLING
Filed April 10, 1939
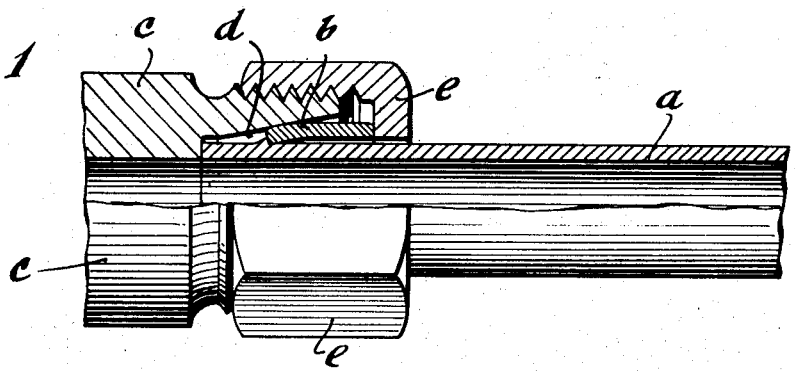
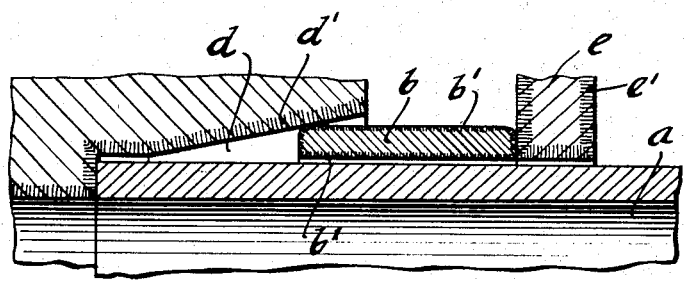
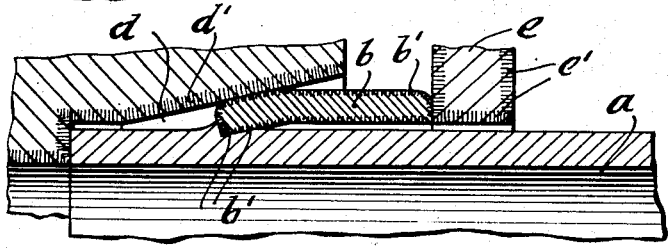
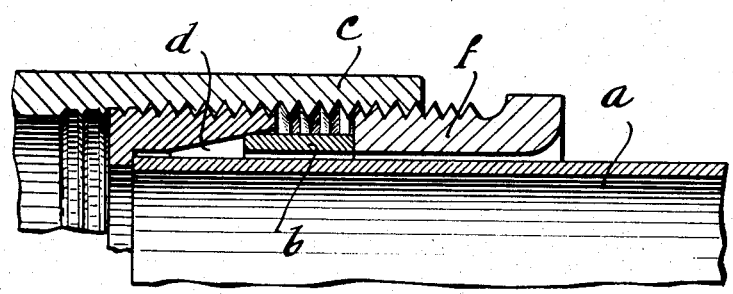
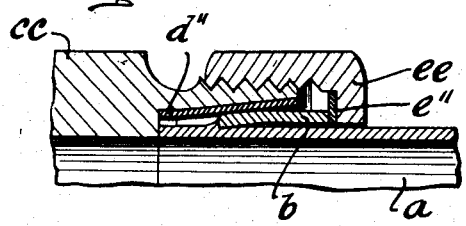
INVENTOR
Hans Kreidel
BY
Cooper, Kerr & Dunham
ATTORNEYS Patented Jan. 28, 1941

2,230,116

UNITED STATES PATENT OFFICE 2,230,116

PIPE COUPLING

Hans Kreidel, Wiesbaden, Germany, assignor to Patex Societe Anonyme, Basel, Switzerland, a corporation of Switzerland Application April 10, 1939, Serial No. 266,934
In Germany October 31, 1938

1 Claim. (Cl. 285—122)

The invention relates to a further improvement of a packing for screwed pipe joints of the form shown in United States Patent No. 2,139,413, in which a metal packing ring is employed, which, when the screw joint is tightened up effects an axial movement of the pipe and acts on the pipe like a cutting tool so that the ring cuts into the tube casing with its front inner edge. The ring is deflected in the inlet funnel of the connecting piece so as to raise a chip and hereby raises the cut pipe material higher than the pipe diameter and thus itself forms the connection contact or bearing surface, that is to serve it as a packing seat or tight seat.

In order to obtain the cutting in action in all cases irrespective of the pipe material that is employed, it has already been suggested that the packing ring be made of deformable and relatively low carbon steel and that it be surface hardened after it has been completely machined. It has, however, appeared that when the screw joint is tightened up the packing ring can jam in the wall of the inlet funnel. The same difficulty has also cropped up even when employing a packing ring made of relatively hard material. Attempts have been made to overcome this difficulty by providing a turned recess in the front end of the packing ring which affords a deflecting wall sheltering or protecting the cutting edge and acting as a sliding surface bearing against the wall of the inlet funnel.

In accordance with the present invention the means just described, of making use of a packing ring that is turned back at its front end, is made unnecessary if the wall of the inlet funnel is given a hardened surface. The connecting piece and inlet funnel may thereby be formed of separate parts, and be connected inseparably with one another or interchangeably with one another. The part of the tightening-up means (external nut or the like) that comes into cooperation with the rear part of the packing ring may have surface hardening in the same way as the wall of the inlet funnel.

Because of its great simplicity, the new pipe screw joint may be manufactured in standardized production and cheaply. It ensures an extremely reliable, durable and absolutely tight connection for tubes or pipes of any kind, also for electrical conduit pipes, as well as for connecting parts or branch and distributing parts of all kinds.

The drawing shows the invention in two examples of construction and application, in a schematic illustration.

Figure 1 shows a pipe screw joint in its tightened up state, partly in plan view and partly in longitudinal section;

Figs. 2 and 3 are enlarged partial sections, showing the screw joint before and after it is tightened up and are to show schematically the approximate ratios of the individual thicknesses of hardened layers;

Fig. 4 shows the upper half of a screw joint shown in section and not tightened up, in which the annular inlet funnel forms a special part of the connecting part and is screwed into the same; and Fig. 5 shows a modification.

In all illustrations $a$ indicates the pipe and $b$ indicates the packing ring, displaceable on the pipe in a longitudinal direction. The front outer edge of the ring is preferably somewhat rounded off, while its corresponding inner edge is sharp edged. It consists of a ring formed of a relatively low carbon steel which is deformable and which has a hardened thin surface layer $b^1$ (Figs. 2 and 3) which is some few hundredths of a millimeter thick. $c$ is the socket or connecting piece having the convergent inner surface or inlet funnel $d$ for the ring $b$ and $e$ is the external nut or coupling element that screws upon the same and serves as a tightening up means for the ring $b$. The connecting piece and the external nut are made of low carbon steel like the packing ring $b$ and have a hardened surface layer $d^1$ and $e^1$, at least at the parts that come into direct contact with the ring, viz. on the inlet funnel and on the bottom of the external nut. The hardened surface layers $d^1$ and $e^1$ on the inlet funnel and the bottom of the external nut, however, are preferably of greater thickness, about five or six times deeper than the hardened surface layer $b^1$ of the packing ring. Instead of making the connecting piece $c$ and the external nut $e$ entirely of steel, they may also be made of soft castings, light-metal, or the like, see $cc$ and $ee$ (Fig. 5) and the parts that come into direct contact with the packing ring, such as the inlet funnel $d''$ and the bottom of the external nut $e''$, may consist of case hardened steel and be inserted into the same, either inseparably or interchangeably.

There is provided in the embodiment shown in Fig. 4, a separate construction of the steel inlet funnel $d$ and a connecting piece $c$ made of another material. The case hardened inlet funnel $d$ made of steel is screwed into the connecting piece $c$, which is made of any desired material and is provided with an internal taper thread.

In order to simplify and cheapen the screw joint, instead of an external nut, which would require external threads, an annular nut $f$ is provided in this case, so that the same internal threads provided in the connecting piece for screwing in the annular inlet funnel may also be used for the tightening up nut.

The screw joint according to the invention is adapted to pipe of any desired material and for any desired purposes. Because the packing ring $b$ during the tightening up of the screw joint cuts into the pipe casing (i. e., it is not merely pressed against the surface of the same as with the known clamped or squeezed ring screw joints), an intimate and tight metallic contact seat and connection is produced for metal pipes, which makes the screw joint particularly adapted also to the laying of the so-called armored steel pipe for conduits for electrical current.

It will be understood that the ring $b$ with its case hardened surface is provided with a sharp inner edged corner or inner leading edge which is well adapted to cut into and seal the cooperating pipe and that the rounded off outer edged corner of the ring or outer leading edge which comes into contact with the inlet funnel portion of the connecting piece is well adapted for improved sliding contact over the surface of the funnel. The packing ring, except for the rounded off corner portion or portions comprises an annulus which is substantially rectangular in cross-section. The rings may be easily fabricated by cutting off lengths of tubing, then grinding off the outer corner or corners thereof and providing the forward sharp inner cutting edge and then case hardening the separate rings.

The hardened surface $d'$ of the inlet funnel provides a surface over which the rounded corner of the cooperating ring may easily slide. Ring jams are not produced and gouging of the inner surface of the funnel is prevented.

What is claimed is:

A pipe coupling comprising a pipe, a packing ring of substantially uniform section throughout its length and harder than said pipe surrounding said pipe intermediate its ends, said packing ring having a sharp inner leading edge for biting engagement with said pipe, a socket having a convergent inner surface hardened to a greater degree than said packing ring for engaging the outer leading edge of said packing ring and a coupling element cooperating with said socket for advancing said packing ring along said convergent surface and deflecting the sharp inner edge into biting relationship with said pipe.

HANS KREIDEL.